United States Patent [19]
Villeret et al.
[11] 3,794,919
[45] Feb. 26, 1974

[54] OUTSIDE LOOP ADAPTATIVE DELTA MODULATION SYSTEM

[75] Inventors: Michel Villeret, Sherbrooke, Quebec; Hubert Stephenne, Rock Forest, Quebec; Pierre A. Deschenes, Sherbrooke, Quebec, all of Canada

[73] Assignee: Universite De Sherbrooke, Bureau des Recherches et des Bourses, Sherbrooke, Quebec, Canada

[22] Filed: Jan. 5, 1973

[21] Appl. No.: 321,522

[52] U.S. Cl. .......... 325/38 B, 325/62
[51] Int. Cl. .......... H03k 13/22
[58] Field of Search ...... 325/42, 62, 65, 38 R, 38 B; 179/15 AV, 15 BF; 332/11 D; 328/161; 333/14

[56] References Cited

UNITED STATES PATENTS

| | | | |
|---|---|---|---|
| 3,327,063 | 6/1967 | Remley | 325/42 X |
| 3,745,464 | 7/1973 | Lee | 325/62 |
| 3,471,648 | 10/1969 | Miller | 179/15 AV X |

*Primary Examiner*—Robert L. Griffin
*Assistant Examiner*—A. M. Psitos

[57] ABSTRACT

An outside loop adaptive delta modulation system. The transmission side of the system includes an envelope detector for detecting the envelope of an analog input signal and a divider for dividing the analog input signal by the envelope signal detected in order to produce a normalized analog signal. An adder is provided for adding the envelope signal and the normalized analog signal and the output of such adder is fed to a non-adaptative delta modulator for modulating the output signal of the adder. The receiving end of the delta modulation system includes a first local demodulator for demodulating an input signal received from the modulator and composed of the envelope of the analog signal and of the normalized signal resulting from the division of such analog signal by the envelope signal, and a low pass filter connected to the output of the first local demodulator for recovering the envelope signal. Such envelope signal corresponds to the envelope signal detected at the input of the transmission side of the delta modulation system. A second local demodulator is also provided for demodulating the normalized signal. The input of such second local demodulator is connected to the input of the receiving system through delay means so as to delay the input of the second local demodulator in such a way that its output is in phase with the output of the above-mentioned low pass filter. The output of the low pass filter and the one of the second local demodulator are fed to a multiplier so as to permit to recover the analog signal. The output of the multiplier is fed to a band-pass filter to eliminate the envelope signal present in the output of the second local demodulator and to filter the high frequency components of the signal which are higher than the audio level.

3 Claims, 6 Drawing Figures

(PRIOR ART)

OUTSIDE LOOP ADAPTATIVE DELTA MODULATION SYSTEM

The invention relates to an outside loop adaptative delta modulation system, and more particularly to a delta modulation system of the syllabic adaptation type.

Delta modulation is a well-known coding system used in communication to transform analog signals into digital signals for the transmission and reproduction of voice. It is characterized in that modulation is carried out using a closed loop system and in that the pulses transmitted represent the variations of the amplitude of the analog signals and not their real amplitude. A delta modulation system is a system in which the pulses generated on the transmission side of the system are fed back to an integrator located in the closed loop system. The output of the integrator is a signal made of a series of steps and such signal is compared to the input analog signal to determine if the input analog signal has increased or decreased since the previous sampling time. When the size of the steps generated by the integrator if fixed, load distortion or quantizing noise occurs depending on whether the size of the step is too large or too small as compared to the variations in amplitude of the input analog signal. In order to overcome such drawbacks, it has been customary to vary the size of the steps with the variations in amplitude of the analog signal. Such modulators are called adaptative or companded delta modulators. One type of adaptative delta modulator has been disclosed in U.S. Patent application Ser. No. 207,437 filed Dec. 13, 1971 in the name of Pierre A. Deschenes et al now U.S. Pat. No. 3757252. However, such system is complicated and, consequently, costly.

It is therefore the object of the present invention to provide an adaptative delta modulation system wherein the adaptation or companding is done outside the feedback loop of the modulator and is therefore much simpler than the known delta modulation systems.

The outside loop adaptative delta modulator in accordance with the invention comprises an envelope detector for detecting the envelope of an analog input signal and a divider for dividing the analog input signal by the envelope signal detected in order to produce a normalized analog signal. An adder is provided for adding the envelope signal and the normalized analog signal and the output of the adder is fed to a non-adaptative delta modulator for modulating the output signal of the adder.

The demodulator located at the receiving end of the delta modulation system comprises a first local demodulator for demodulating and input signal received from the modulator and composed of the envelope of the analog signal and of the normalized signal resulting from the division of the analog signal by the envelope signal, and a low pass filter connected to the output of such first local demodulator for recovering the envelope signal. A second demodulator is provided for demodulating the input signal and such second local demodulator is connected to the input signal through delay means for producing a slight delay in the input signal so as to compensate for the delay introduced by the above-mentioned low pass filter. The output of the low pass filter and the one of the second local demodulator are fed to a multiplier for recovering the analog input signal. The output of the multiplier is connected to a band-pass filter for eliminating the envelope signal passed by the second local demodulator and for eliminating the frequencies higher than the audio level.

The invention will now be disclosed, by way of example, with reference to a preferred embodiment thereof and to the accompanying drawings in which.

Figure 4:
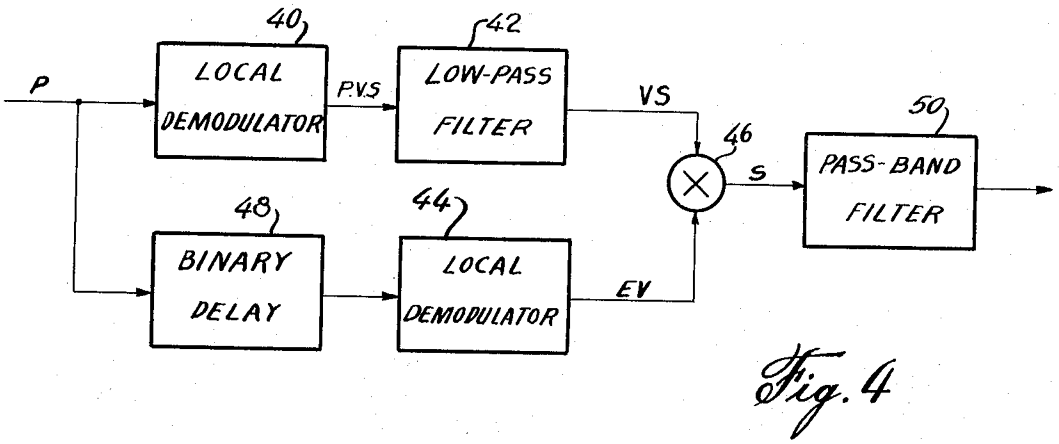
Figure 3A:
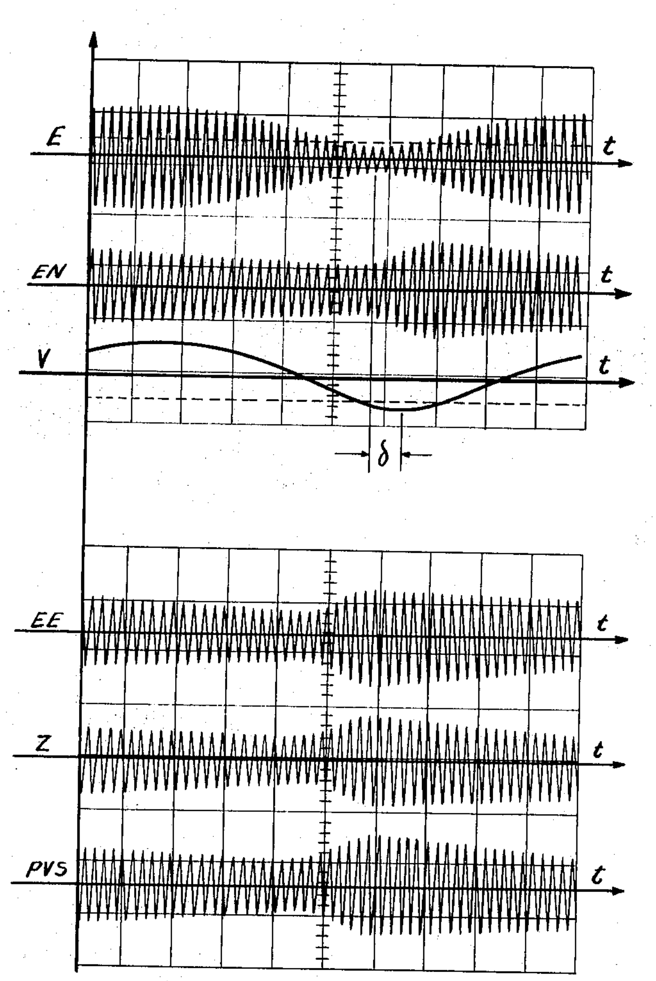
Figure 3B:
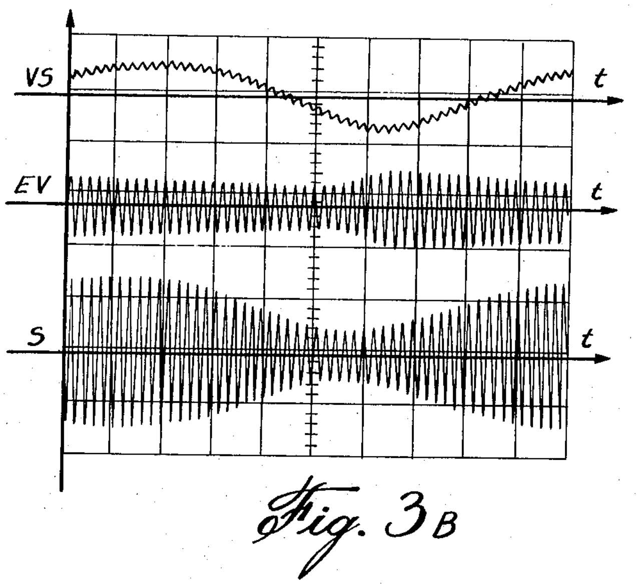
Figure 5:
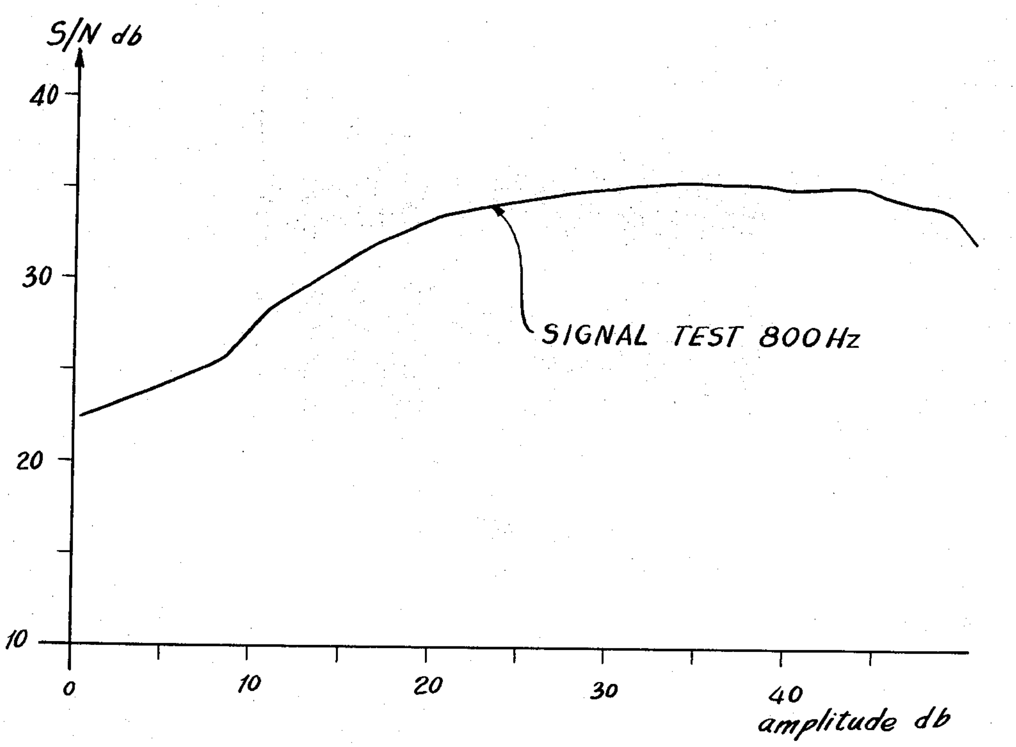

FIGS. 3*a* and 3*b* illustrate the wave forms appearing at the output of the elements of the delta modulation system in accordance with the invention; and FIG. 4 illustrates the receiving end of the delta modulation system in accordance with the invention;

FIG. 5 illustrates the signal-to-noise ratio measured with the apparatus in accordance with the invention.

Figure 1:
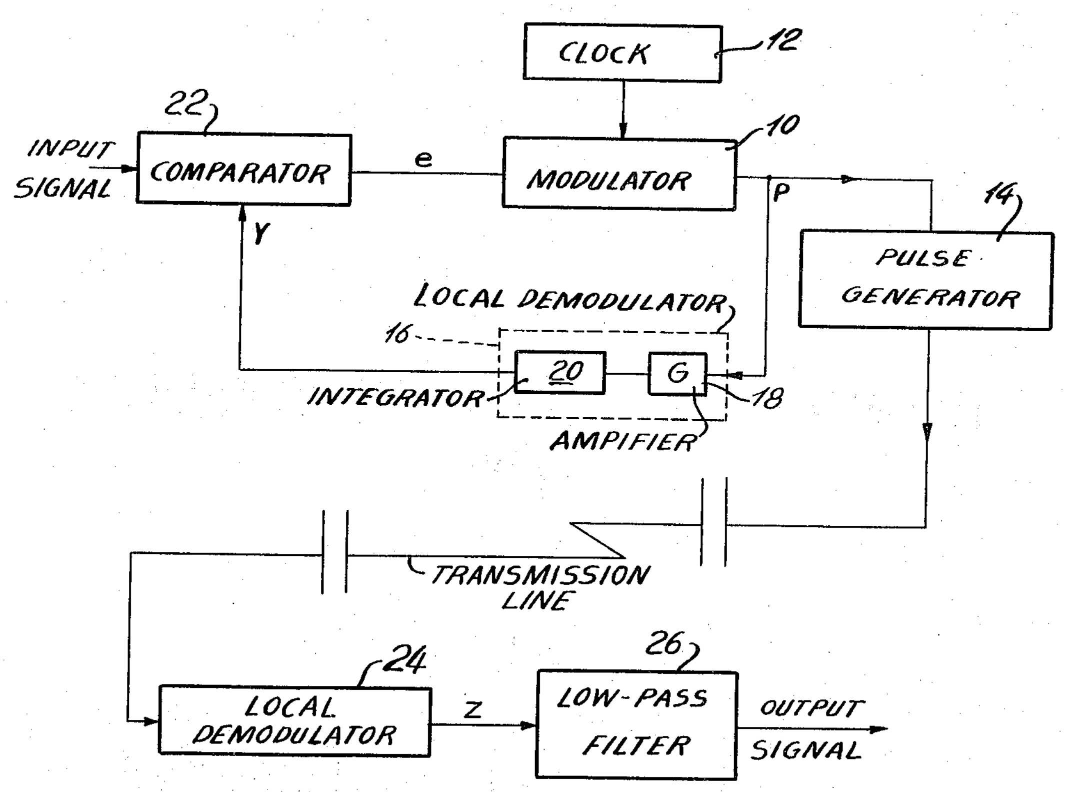
Fig. 1 (PRIOR ART)
FIG. 1 illustrates a known delta modulation system.

Referring to FIG. 1, there is shown the basic diagram of a known delta modulation system. The portion of the system located at the transmitting end comprises a modulator 10 controlled by a clock 12. The output of the modulator 10 is fed to a pulse generator or shaper 14 and to a local demodulator 16. The local demodulator includes an amplifier 18 having a gain G and an integrator 20. The output of the integrator 20 is applied to a comparator 22 which compares the output of the integrator with the analog input signal and, depending on whether the analog input signal is higher or lower than the output of the integrator, causes the modulator to generate a positive or negative pulse.

In operation, the modulator 10, under the control of the clock 12, generates a series of pulses $p$ which are integrated by the integrator to produce a staircase signal $y$ which is compared with the analog input signal $x$. The comparator generates a signal $e$ depending on the sign of the difference between the signals $x$ and $y$ and such signal $e$ controls the modulator 10 in known manner.

The receiving end of the known delta modulation system of FIG. 1 comprises a local demodulator 24 for recovering the analog input signal and a low pass filter for eliminating from the output $z$ of the local demodulator the components of the high frequency signal which are higher than the audiolevel.

As commonly known, the gain G of the feedback loop is varied with the amplitude of the analog signal in order to prevent overload distortion resulting from the fact that the steps are too small and that consequently the integrator cannot adequately follow the variations of the analog input signal, or to prevent quantitizing noise resulting from the fact that the steps are too large to permit to integrator to follow small variations of the analog signal. Various methods of varying the gain of the feedback loop exist. Such methods are of the syllabic or of the instaneous adaptation type.

There are two types of syllabic adaptation or companding depending on whether the gain control signal is derived from the analog input signal or from the coded digital output signal. The gain control signal may be derived from the analog input signal using a simple envelope detector. Similarly the gain control signal may be derived from the digital output signal by means of a syllabic filter. Such syllabic companding systems provide a continuous adaptation of the gain G of the amplifier 18 so as to vary the amplitude of the steps accordingly.

The instaneous adaptation or companding is derived from the digital output signal on a short time basis. The information derived is fed to a logic block which in turn controls the gain of the feedback loop in descrete steps.

Contrary to the above method, the adaptation method in accordance with the invention is done by varying the amplitude A of the analog input signal fed to the delta modulator instead of varying the size of the steps 6. It is therefore an "outside loop" adaptative delta modulation system.

Figure 2:
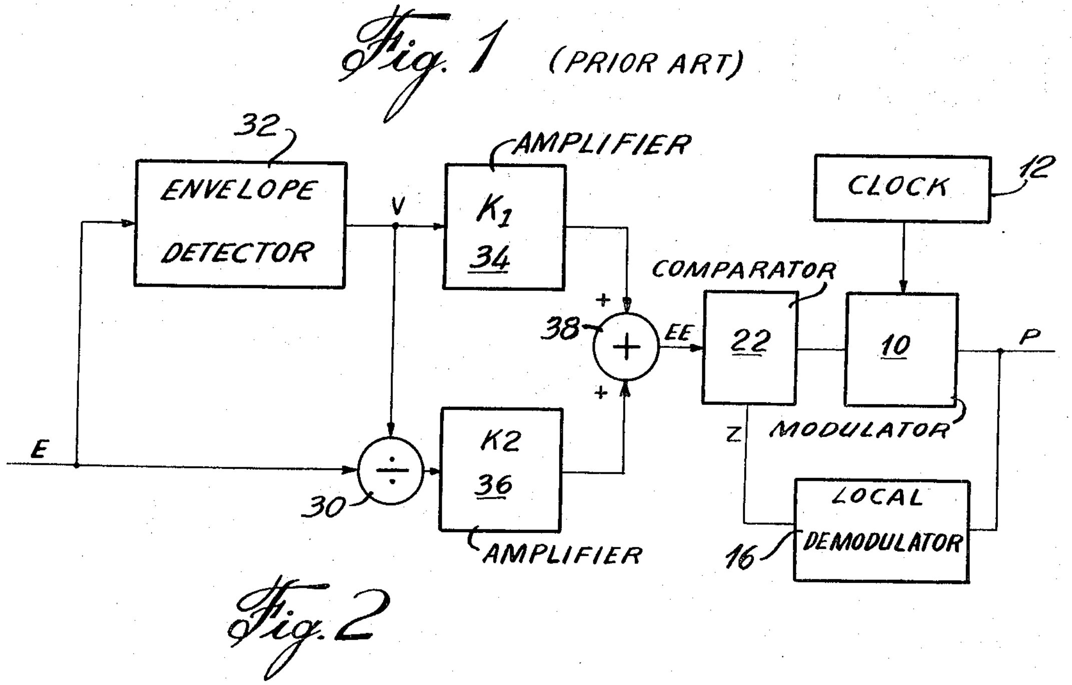
FIG. 2 illustrates the transmitting end of a delta modulation system in accordance with the invention.

Referring to FIG. 2 of the drawings, the analog input signal E is fed to a divider 30 and the dividing ratio of such divider is controlled by an envelope detector 32 generating an output signal V proportional to the envelope of the analog signal E. The output of the divider 30 is thus a normalized signal EN which, in theory, should be constant but, in practice, varies slightly due to the delay introduced by the envelope detector 32 which is normally made of a rectifier arrangement followed by a RC circuit. FIG. *3a* of the drawings illustrates, by way of example, a sinusoidal signal E of 800 Hz modulated by a carrier of 10 Hz representing the variations in amplitude of the signal of 800 Hz. There is also illustrated the normalized signal EN as well as the envelope signal V detected. The phase shift $\delta$ introduced by the envelope detector is also shown but its effect on the normalized signal EN is not significant. This phase shift in the modulator is reconstituted in the demodulator so that back shifting into phase is not required in the demodulator.

The envelope signal V and the normalized signal EN are fed to respective amplifiers 34 and 36 having amplification factors $K_1$ and $K_2$ respectively. The outputs of the amplifiers 34 and 36 are fed to an adder 38. The amplification factors $K_1$ and $K_2$ may be adjusted so as to vary the amplitude of the envelope signal with respect to the normalized signal so as to obtain optimum results. The amplifiers 34 and 36 may be operational amplifiers which are well known in the art.

The output EE of the adder 38 is thus the sum of the envelope signal and of the normalized signal as illustrated in FIG. *3a* of the drawings. Such signal EE is fed to a non-adaptative delta modulator as illustrated in FIG. 1 of the drawings, that is a modulator having a fixed gain G in the feedback loop. Such non-adaptative modulator is identified by the same reference numerals as in FIG. 1 and not disclosed any further. The output Z of the local demodulator 16 is illustrated in FIG. *3a* of the drawings. Such output signal is shown in its idealized form although, in practice, it would be composed of a series of steps. Since the amplitude of the signal EE is nearly constant, the size of the steps may be adjusted by fixing the gain G so as to minimize overload distortion and quantizing noise.

Since adaptation or companding is done using an envelope detector, the so far described delta modulation system is of the syllabic type.

The receiving end of the delta modulation system in accordance with the invention is illustrated in FIG. 4. The signal *p* transmitted by the modulator of FIG. 4 is fed to a first local demodulator 40 and the output PVS of such local demodulator is applied to a low pass filter 42 which passes only the low frequencies of the signal *p* corresponding to the envelope signal V of the modulator and identified by VS. Such low pass filter hence permits to reconstitute the envelope signal V. The input signal *p* is also fed to a second local demodulator 44 to reconstitute the normalized signal EV corresponding to signal EN of the modulator of FIG. 2. The envelope signal VS and the normalized signal EV are subsequently fed to a multiplier 46 for reconstituting the original analog signal E identified by S. However, in order to compensate for the delay introduced by low pass filter 42, the signal *p* is delayed by binary delay 48 so as to put normalized signal EV in phase with envelope signal VS. Signals PVS, VS and EV are also illustrated in FIGS. *3a* and *3b* of the drawings. Finally, the output signal S of the multiplier is fed to a band-pass filter 50 to eliminate the low frequency signals corresponding to the envelope signal present in signal S as well as the frequency components higher than the normal voice band.

The local demodulators 40 and 44 are similar to the local demodulator 16 of FIG. 2 of the drawings and are well known in the art. The low pass filter 42, the binary delay 48 and the band-pass filter 50 are also of the conventional type.

FIG. 5 of the drawings illustrates the signal to noise ratio S/N measured with the apparatus in accordance with the invention. It will be seen that, using a test signal of 800 Hz, such signals S/N varies from 25 to 35 db for amplitude variations up to 40 db. This is comparable with the well-known adaptative delta modulators.

Although the invention has been disclosed with reference to a preferred embodiment thereof, it is to be understood that various modifications may also be envisaged within the scope of the following claims.

We claim:

1. An outside loop adaptative delta modulator comprising:

a. an envelope detector for detecting the envelope of an analog input signal so as to produce an envelope signal;
b. a divider for dividing the analog input signal by the envelope signal detected in order to produce a normalized analog signal;
c. an adder for adding said envelope signal and said normalized analog signal; and
d. a non-adaptative delta modulator connected to the output of said adder for modulating the output signal of said adder.

2. An outside loop adaptative delta modulator as defined in claim 1, further comprising a first amplifier connected to the output of said envelope detector for amplifying the envelope signal, and a second amplifier connected to the output of said divider for amplifying said normalized signal, the amplification factors of said amplifiers being chosen in function of the desired ratio of the envelope signal over the normalized signal.

3. A demodulator for use with an outside loop adaptative delta modulator comprising:

a. a first local demodulator for demodulating an input signal composed of the envelope of an analog signal and of a normalized signal resulting from the division of said analog signal by said envelope signal;
b. a low pass filter connected to the output of said first local demodulator for recovering said envelope signal;
c. delay means for delaying said input signal;
d. a second local demodulator for demodulating the output signal of said delay means, said second local demodulator producing an output signal in phase with the output signal of said low pass filter;

e. a multiplier for multiplying the output signals of said low pass filter and of said second local demodulator to reconstitute the analog signal;

f. a band-pass filter connected to the output of said multiplier for eliminating the envelope signal and the frequencies higher than the normal voice frequencies.

* * * * *